US011417339B1

(12) United States Patent
Wang et al.

(10) Patent No.: US 11,417,339 B1
(45) Date of Patent: Aug. 16, 2022

(54) DETECTION OF PLAGIARIZED SPOKEN RESPONSES USING MACHINE LEARNING

(71) Applicant: Educational Testing Service, Princeton, NJ (US)

(72) Inventors: Xinhao Wang, San Carlos, CA (US); Keelan Evanini, Pennington, NJ (US); Yao Qian, Dublin, CA (US); Klaus Zechner, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 149 days.

(21) Appl. No.: 16/695,348

(22) Filed: Nov. 26, 2019

Related U.S. Application Data

(60) Provisional application No. 62/779,213, filed on Dec. 13, 2018, provisional application No. 62/774,917, filed on Dec. 4, 2018.

(51) Int. Cl.
*G10L 15/26* (2006.01)
*G10L 15/197* (2013.01)
*G10L 25/51* (2013.01)
*G10L 15/16* (2006.01)

(52) U.S. Cl.
CPC .............. *G10L 15/26* (2013.01); *G10L 15/16* (2013.01); *G10L 15/197* (2013.01); *G10L 25/51* (2013.01)

(58) Field of Classification Search
CPC ......... G10L 15/00; G10L 15/16; G10L 15/26; G10L 15/197; G10L 25/00; G10L 25/51; G06F 40/30
See application file for complete search history.

(56) References Cited

U.S. PATENT DOCUMENTS

| 5,953,006 A * | 9/1999 | Baker ................ G09G 5/00 715/700 |
| 2013/0013603 A1* | 1/2013 | Parker ................ G06F 16/353 707/737 |
| 2015/0194147 A1* | 7/2015 | Yoon ................ G09B 19/06 704/236 |

(Continued)

OTHER PUBLICATIONS

Z. Su, B. Ahn, K. Eom, M. Kang, J. Kim and M. Kim, "Plagiarism Detection Using the Levenshtein Distance and Smith-Waterman Algorithm," 2008 3rd International Conference on Innovative Computing Information and Control, 2008, pp. 569-569, doi: 10.1109/ICICIC.2008.422. (Year: 2008).*

(Continued)

*Primary Examiner* — Daniel C Washburn
*Assistant Examiner* — Sean E Serraguard
(74) *Attorney, Agent, or Firm* — Jones Day

(57) ABSTRACT

Data is received that encapsulates a spoken response to a test question. Thereafter, the received data is transcribed into a string of words. The string of words is then compared with at least one source string so that a similarity grid representation of the comparison can be generated that characterizes a level of similarity between the string of words and the at least one source string. The grid representation is then scored using at least one machine learning model. The score indicates a likelihood of the spoken response having been plagiarized. Data providing the encapsulated score can then be provided. Related apparatus, systems, techniques and articles are also described.

15 Claims, 5 Drawing Sheets

(56) References Cited

U.S. PATENT DOCUMENTS

| | | | |
|---|---|---|---|
| 2015/0254555 A1* | 9/2015 | Williams, Jr | G06N 3/0454 |
| | | | 706/14 |
| 2015/0269932 A1* | 9/2015 | Evanini | G06F 40/30 |
| | | | 704/235 |
| 2017/0039869 A1* | 2/2017 | Gleim | G09B 7/00 |

OTHER PUBLICATIONS

Conneau, A., Schwenk, H., Barrault, L., & LeCun, Y. Very Deep Convolutional Networks for Natural Language Processing. (2016). ArXiv, abs/1606.01781. (Year: 2016).*

S. Cheng, W. Xu and K. Mueller, "ColorMapND: A Data-Driven Approach and Tool for Mapping Multivariate Data to Color," in IEEE Transactions on Visualization and Computer Graphics, vol. 25, No. 2, pp. 1361-1377, Feb. 1, 2019, doi: 10.1109/TVCG.2018.2808489 (Year: 2019).*

Alzahrani, Salha, Salim, Naomie, Abraham, Ajith; Understanding Plagiarism Linguistic Patterns, Textual Features, and Detection Methods; IEEE Transactions on Systems, Man, and Cybernetics—Part C: Applications and Reviews, 42(2); pp. 133-149; Mar. 2012.

Blanchard, Daniel, Heilman, Michael, Madnani, Nitin; SciKit-Learn Laboratory; GitHub repository, https://github.com/EducationalTestingService/skll.; 2013.

Brin, Sergey, Davis, James, Garcia-Molina, Hector; Copy Detection Mechanisms for Digital Documents; Proceedings of the ACM SIGMOD Annual Conference; pp. 398-409; 1995.

Chen, Chien-Ying, Yeh, Jen-Yuan, Ke, Hao-Ren; Plagiarism Detection Using ROUGE and WordNet; Journal of Computing, 2(3); pp. 34-44; Mar. 2010.

Cullen, Pauline, French, Amanda, Jakeman, Vanessa; The Official Cambridge Guide to IELTS; Cambridge University Press; 2014.

ETS; The Official Guide to the TOEFL Test, Fourth Edition; McGraw-Hill: New York, NY; 2012.

Evanini, Keelan, Wang, Xinhao; Automatic Detection of Plagiarized Spoken Responses; Proceedings of the 9th Workshop on Innovative Use of NLP for Building Educational Applications; Baltimore, MD; pp. 22-27; Jun. 2014.

Hoad, Timothy, Zobel, Justin; Methods for Identifying Versioned and Plagiarized Documents; Journal of the American Society for Information Science and Technology, 54(3); pp. 203-215; 2003.

Hu, Jie, Shen, Li, Sun, Gang; Squeeze-and-Excitation Networks; IEEE Conference on Computer Vision and Pattern Recognition; pp. 7132-7141; 2018.

Ioffe, Sergey, Szegedy, Christian; Batch Normalization: Accelerating Deep Network Training by Reducing Internal Covariate Shift; ArXis; Feb. 2015.

Krizhevsky, Alex, Sutskever, Ilya, Hinton, Geoffrey; ImageNet Classification with Deep Convolutional Neural Networks; Proceedings of the Advances in Neural Information Processing Systems; pp. 1097-1105; 2012.

Kusner, Matt, Sun, Yu, Kolkin, Nicholas, Weinberger, Killian; From Word Embeddings to Document Distances; Proceedings of the 32nd International Conference on Machine Learning, vol. 37 of Proceedings of Machine Learning Research; pp. 957-966; 2015.

Longman, Pearson; The Official Guide to Pearson Test of English Academic; Pearson Education ESL; 2010.

Lyon, Caroline, Barrett, Ruth, Malcolm, James; Plagiarism is Easy, but Also Easy to Detect; Plagiary: Cross-Disciplinary Studies in Plagiarism, Fabrication, and Falsification; pp. 57-65; 2006.

Mozgovoy, Maxim, Kakkonen, Tuomo, Sutinen, Erkki; Using Natural Language Parsers in Plagiarism Detection; Proceedings of the ISCA Workshop on Speech and Language Technology in Education (SLaTE); 2007.

Nahnsen, Thade, Uzuner, Ozlem, Katz, Boris; Lexical Chains and Sliding Locality Windows in Context-Based Text Similarity Detection; International Joint Conference on Natural Language Processing; pp. 150-154; 2005.

Potthast, Martin, Hagen, Matthias, Gollub, Tim, Tippmann, Martin, Kiesel, Johannes, Rosso, Paolo, Stamatatos, Efstathios, Stein, Benno; Overview of the 5th International Competition on Plagiarism Detection; CLEF 2013 Evaluation labs and Workshop—Working Notes Papers, P. Forner, R. Navigli, Dan Tuffs (Eds.); Sep. 2013.

Shivakumar, Narayanan, Garcia-Molina, Hector; SCAM: A Copy Detection Mechanism for Digital Documents Proceedings of the 2nd Annual Conference on the Theory and Practice of Digital Libraries; 1995.

Simonyan, Karen, Zisserman, Andrew; Very Deep Convolutional Networks for Large-Scale Image Recognition; ICLR; 2015.

Stamatatos, Efstathios; Plagiarism Detection Using Stopword n-grams; Journal of the American Society for Information Science an Technology, 62(12); pp. 2512-2527; 2011.

Stein, Benno, Lipka, Nedim, Prettenhofer, Peter; Intrinsic Plagiarism Analysis; Language Resources and Evaluation, 45(1); pp. 63-82; Mar. 2011.

Szegedy, Christian, Ioffe, Sergey, Vanhoucke, Vincent, Alemi, Alex; Inception-v4, Inception-ResNet and the Impact of Residual Connections on Learning; Proceedings of the 31st AAAI Conference on Artificial Intelligence; pp. 1278-4284; 2017.

Szegedy, Christian, Liu, Wei, Jia, Yangqing, Sermanet, Pierre, Reed, Scott, Anguelov, Dragomir, Erhan, Dumitru, Vanhoucke, Vincent, Rabinovich, Andrew; Going Deeper with Convolutions; CVPR; 2015.

Szegedy, Christian, Vanhoucke, Vincent, Ioffe, Sergey, Shlens, Jon, Wojna, Zbigniew; Rethinking the Inception Architecture for Computer Vision; CVPR; pp. 2818-2826; 2015.

Uzuner, Ozlem, Katz, Boris, Nahnsen, Thade; Using Syntactic Information to Identify Plagiarism; Proceedings of the 2nd Workshop on Building Educational Applications Using NLP; pp. 37-44; Jun. 2005.

Wang, Xinhao, Evanini, Keelan, Bruno, James, Mulholland, Matthew; Automatic Plagiarism Detection for Spoken Responses in an Assessment of English Language Proficiency; IEEE Workshop on Spoken Language Technology; San Diego, CA; pp. 121-128; Dec. 2016.

Wang, Xinhao, Yoon, Su-Youn, Evanini, Keelan, Zechner, Klaus, Qian, Yao; Automatic Detection of Off-Topic Spoken Responses Using Very Deep Convolutional Neural Networks; INTERSPEECH; pp. 4200-4204; Sep. 2019.

Wang, Xinhao, Evanini, Keelan, Qian,Yao, Zechner, Klaus; Using Very Deep Convolutional Neural Networks to Automatically Detect Plagiarized Spoken Responses; IEEE Automatic Speech Recognition and Understanding Workshop; Sentosa, Singapore; Dec. 2019.

* cited by examiner

DETECTION OF PLAGIARIZED SPOKEN RESPONSES USING MACHINE LEARNING

RELATED APPLICATIONS

The current applications claims priority to both of U.S. Pat. App. Ser. No. 62/774,917 filed on Dec. 4, 2018 and U.S. Pat. App. Ser. No. 62/779,213 filed on Dec. 13, 2018, the contents of both of which are hereby fully incorporated by reference.

TECHNICAL FIELD

The subject matter described herein relates to the automatic detection of plagiarized spoken responses utilizing machine learning.

BACKGROUND

Plagiarism of spoken responses has become a vexing problem for educators in the domain of spoken language evaluation, in particular, the evaluation of non-native speaking proficiency, because there exists a vast amount of easily accessible online resources covering a wide variety of topics that test takers can use to prepare their responses in advance. In the context of large-scale, standardized assessments of spoken English for academic purposes, such as the TOEFL iBT test, the Pearson Test of English Academic, and the IELTS Academic assessment, some test takers may utilize content from on-line resources or other prepared sources in their spoken responses to test questions that are intended to elicit spontaneous speech. These responses that are based on prepared materials pose a problem for both human raters and automated scoring systems and can reduce the validity of scores that are provided to the test takers; therefore, research into methods of automatically detecting plagiarized spoken responses is warranted.

In a typical procedure for identifying plagiarized spoken responses in an operational test, human raters first flag spoken responses that contain potentially plagiarized material which are subsequently reviewed by trained experts who make a final determination as to whether the response was plagiarized. During the review process, the responses are transcribed and compared to external source materials obtained through manual searches; if it is determined that the presence of plagiarized material would make it impossible to provide a valid assessment of the test taker's performance on the speaking task, the response is labeled as plagiarized.

In some cases, the test taker's spoken response can be nearly identical to an identified source; in other cases, several sentences or phrases are clearly drawn from one or multiple particular sources, although some modifications are apparent. Table 1 presents a sample source along with a sample plagiarized response that appear to contain extended sequences of words directly matching idiosyncratic features of this source, such as the phrases, "how romantic it can ever be" and "just relax yourself on the beach." In general, test takers typically do not reproduce the entire source material in their responses; rather, they may attempt to adapt the source material to a specific test question by providing some speech that is directly relevant to the prompt and combining it with the plagiarized material. An example of this is shown by the opening and closing non-italicized portions of the sample plagiarized response in Table 1.

Table 1. Shows a sample source passage and the transcription of a sample plagiarized spoken response that was apparently drawn from the source. The test question/prompt used to elicit this response is also included. Overlapping word sequences are indicated in italics.

TABLE 1

Sample source passage:
Well, the place I enjoy the most is a small town located in France. I like this small town because it has very charming ocean view. I mean the sky there is so blue and the beach is always full of sunshine. You know how romantic it can ever be, just relax yourself on the beach, when the sun is setting down, when the ocean breeze is blowing and the seabirds are singing. Of course I like this small French town also because there are many great French restaurants. They offer the best seafood in the world like lobsters and tuna fishes. The most important, I have been benefited a lot from this trip to France because I made friends with some gorgeous French girls. One of them even gave me a little watch as a souvenir of our friendship.
Prompt: Talk about an activity you enjoyed doing with your family when you were a kid.
Transcription of a sample plagiarized response: family is a little trip to France when I was in primary school ten years ago I enjoy this activity first because we visited a small French town located by the beach the town has very charming ocean view and in the sky is so blue and the beach is always full of sunshine you know how romantic it can ever be just relax yourself on the beach when the sun is settling down the sea birds are singing of course I enjoy this activity with my family also because there are many great French restaurants they offer the best sea food in the world like lobsters and tuna fishes so I enjoy this activity with my family very much even it has passed several years

SUMMARY

In a first aspect, data is received that encapsulates a spoken response to a test question. Thereafter, the received data is transcribed into a string of words. The string of words is then compared with at least one source string so that a similarity grid representation of the comparison can be generated that characterizes a level of similarity between the string of words and the at least one source string. The grid representation is then scored using at least one machine learning model. The score indicates a likelihood of the spoken response having been plagiarized. Data providing the encapsulated score can then be provided.

Providing, in this regard, can include one or more of displaying the score in an electronic visual display, loading data encapsulating the score in memory, storing the data encapsulating the score in physical persistence, or transmitting the data encapsulating the score to a remote computing device.

The transcribing can utilize an automated speech recognition (ASR) engine.

The at least one machine learning model can take various forms such as a deep learning model (e.g., a very deep convolutional neural network, etc.).

The similarity grid representation can be a similarity grid that comprises a single channel in which each pixel indicates whether or not there is a match between pairs of words from the string of words and the at least one source string. In other variations, the similarity grid comprises a multiple channel in which channel utilizes a different similarity determination technique. A first of the similarity determination techniques can indicate whether there is an exact match between a word in the string of words and the at least one source string. A second of the similarity determination techniques can stem the words in the string of words and the at least one source string and compares the corresponding stems. A third of the similarity determination techniques can calculate similarities between a word in the string of words and the at least one source string using embeddings.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides innovative techniques for detecting plagiarized responses in the context of spoken language assessment. Text-to-text similarity comparison between two documents is visualized in a grid and then a machine learning model such as very deep convolutional neural networks is employed to detect instances of plagiarism. This approach outperforms conventional techniques that are based on text-to-text content similarity. In fact, this approach can be applied more generally for any task that relies on similarity measurements between two sequences. In addition, as represented in multiple-channel grids, the information in different scales, for example, exact word match vs. word embedding-based similarity, can be incorporated and processed within a single grid.

Figure 1:
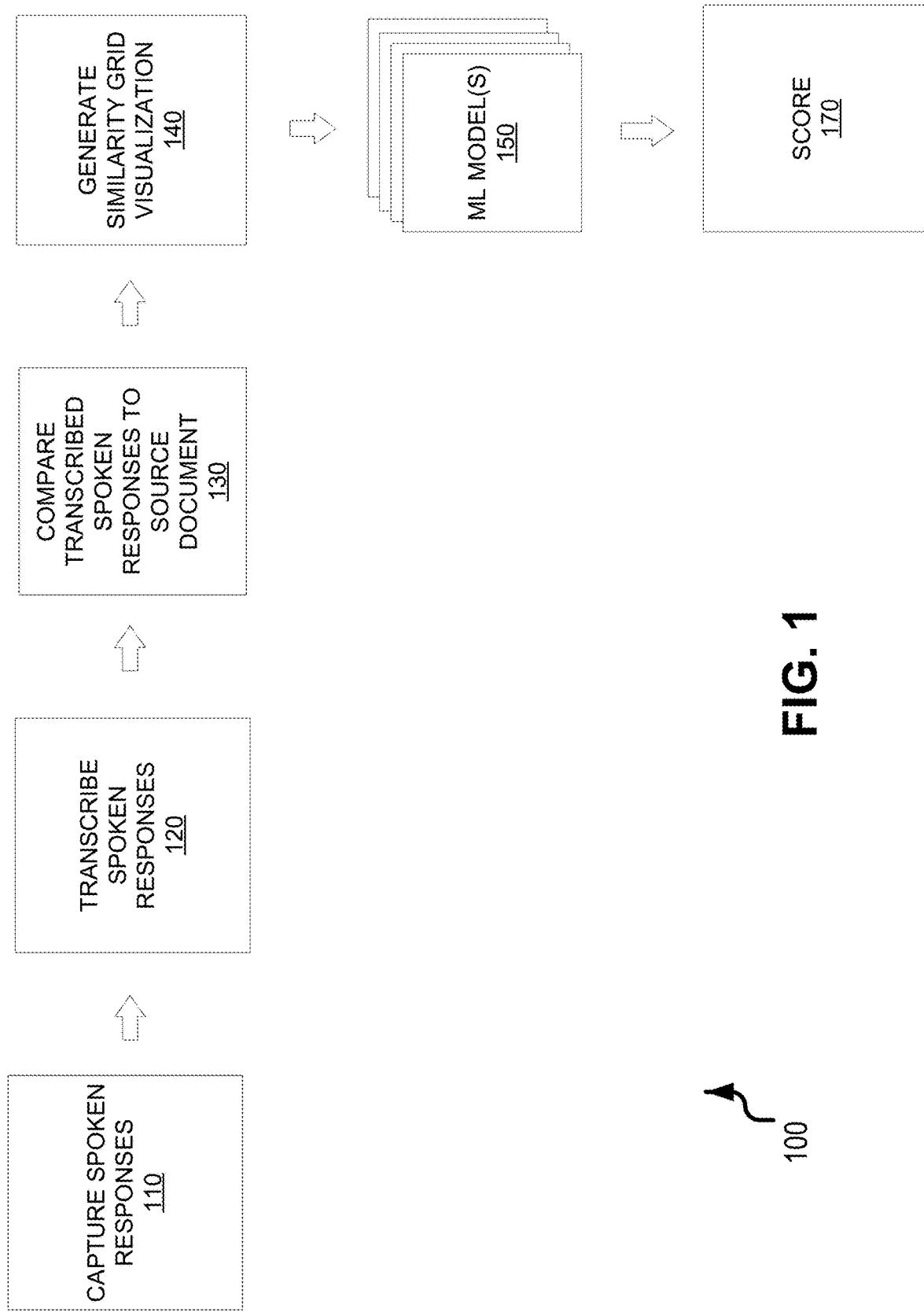
FIG. 1 is a diagram illustrating a workflow for detecting plagiarized spoken responses using machine learning.

FIG. 1 is a diagram 100 illustrating a workflow providing enhanced techniques for detecting whether a spoken response is copied or otherwise derived from a known source. Initially, at 110, spoken responses to various test questions are captured (i.e., detected by a microphone, recorded, etc.). These spoken responses are transcribed, at 120, using automatic speech recognition (ASR) technique. Next, at 130, the transcribed spoken responses are compared to at least one source document. This comparison is then used to generate, at 140, a similarity grid visualization. This similarity grid is then input into one or more machine learning models 150 (e.g., a deep learning model) which are trained using historical data to generate a classification of the spoken response such as a score 170. The score 170 can be a binary classification (plagiarized/non-plagiarized) or it can be a numerical value over a range (e.g., 0.00 to 1.00, etc.)

Figure 2:
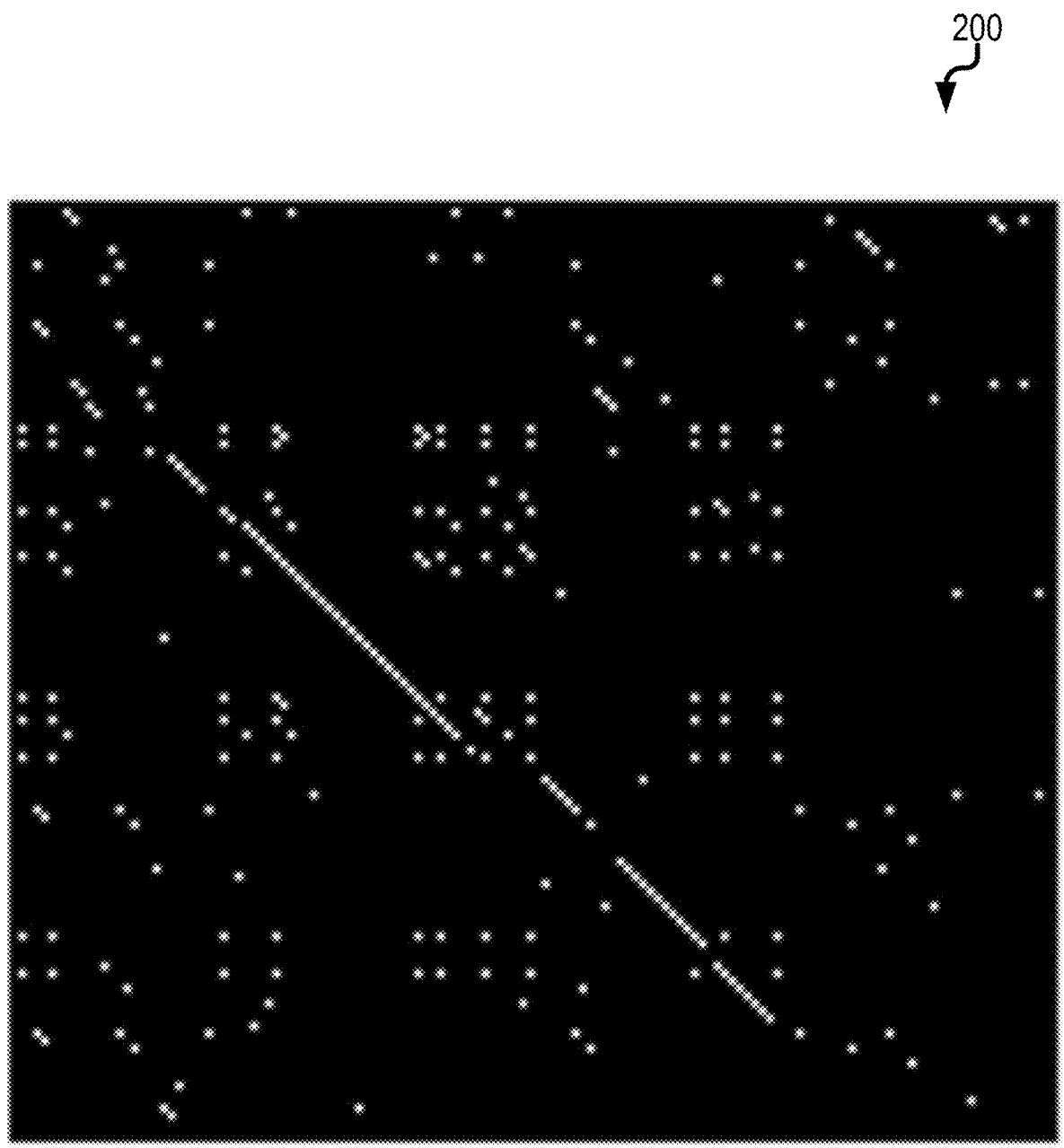
FIG. 2 is a diagram illustrating an example 1-channel similarity visualization.

FIG. 2 shows an example visualized image 200 of the constructed grid (generated at 140) corresponding to the example shown in Table 1, in which the 126 words from the test response are ordered on the y-axis from top to the bottom and the 140 words from the source are ordered on the x-axis from left to right. Each pixel value indicates whether the word from the test response matches the word in the source, i.e., a white pixel with a value of 255 (match) or a black pixel with a value of 0 (no match). The diagonal lines represent clear matching sequences between two texts. Using this visualized grid, one or more image recognition methods can be applied to measure the degree of similarity between two documents and then distinguish between plagiarized and non-plagiarized responses.

As shown in FIG. 2, the comparison between a test response and a source material can be visualized as a 1-channel black-and-white image, where each pixel has a value of either 0 (black) or 255 (white) to indicate the matches between word pairs. In some variations, such information can be enriched by using more than one value to encode each cell, such as using three values encoding a pixel in an RGB image, i.e., a 3-channel grid.

In some variations, 3-channel grids can be generated to compare two documents. Given a cell in a grid, corresponding to a comparison between a word in the test response (on the y-axis) and a word in the source (on the x-axis), different methods for calculating the cell values in the three different channels can be utilized. For example, the first channel can indicate whether the two words are exact matches with values of 255 (match) or 0 (no match), as in the 1-channel grid shown in FIG. 2. As another example, after stemming the words (using, for example, a Porter Stemmer), the second channel can indicate whether the two stems are exact matches, again with values of 255 (match) or 0 (no match). Further, the third channel can contain word similarities calculated using embeddings. With this arrangement, word embeddings, for example, word2vec models trained on the Google News Corpus, can be used to extract vectors and then cosine similarities can be calculated and linearly mapped to integers between 0 and 255. With a multi-channel approach, the similarity measured in a grid will not rely exclusively on exact string matches and thus may be robust to modifications between the source text and the plagiarized response. In other variations, the grid can include as many channels as necessary to encode the inputs from different aspects.

Afterward, machine learning techniques, such as very deep convolutional neural networks (CNNs) popular in the field of image recognition, can be applied on the visualized grids to distinguish plagiarized and non-plagiarized spoken responses. In order to build such deep learning-based models, training samples can be generated: for the positive class, each response can be paired with the source used by the test taker to draw this response; while for the negative class, each response can be paired with one randomly selected source. Afterward, the paired samples are converted to labeled grids, and fed into neural networks for training.

Due to the large variations in lengths of test responses and source materials, the grids generated by this process can also have different dimensions. With arrangements requiring fixed-length inputs such as an inception network, bilinear interpolation can be applied to scale all lexical matching grids into a standard size of 240 (the maximum length of a test response) by 320 (the maximum length of a source document). This quadratic interpolation method can reduce information loss as in the commonly used cut-off way to truncate the inputs of convolutional neural networks.

Figure 3:
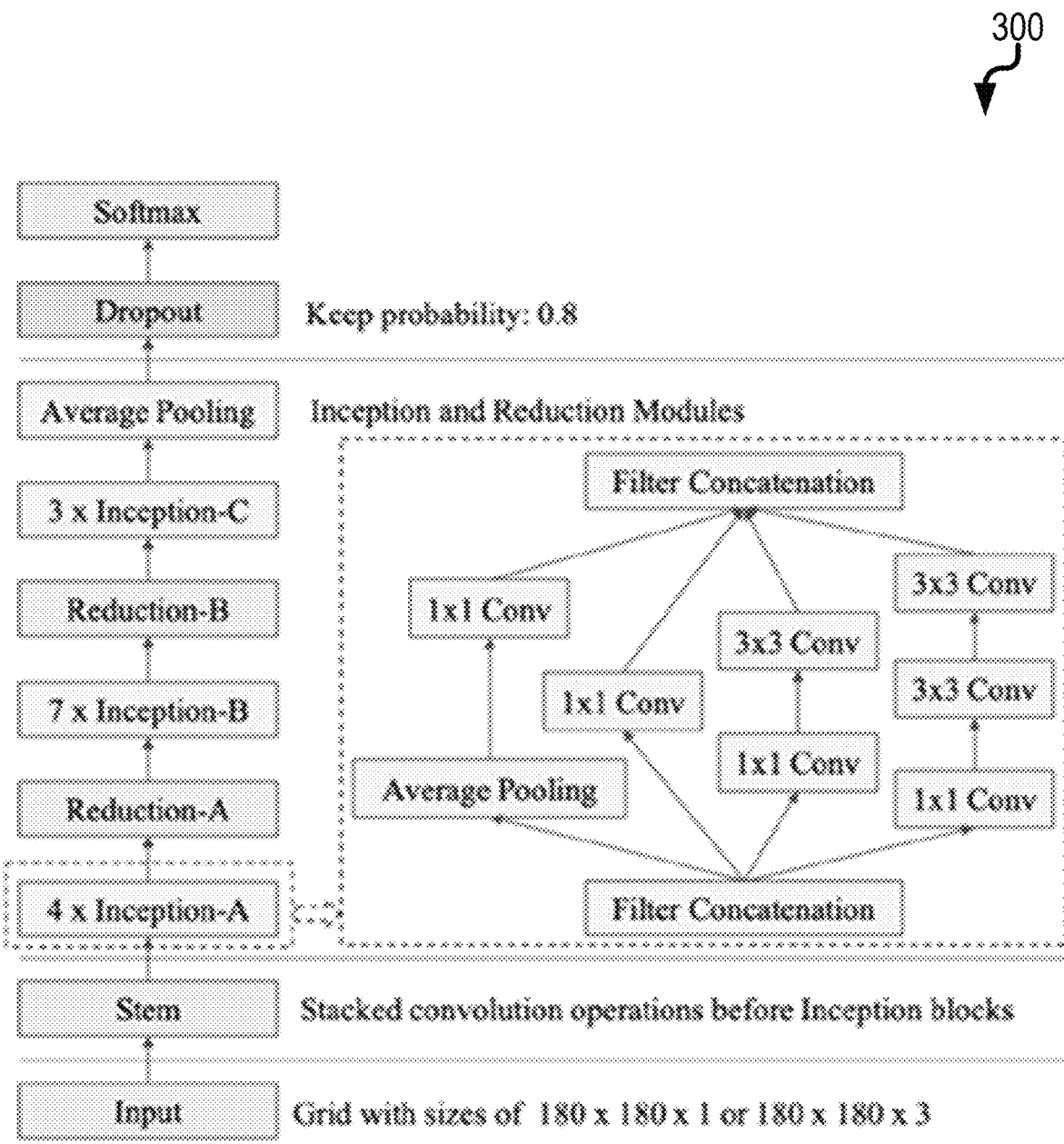
FIG. 3 is a diagram illustrating a sample machine learning model that can be used with some variations of the current subject matter.

In some variations, an Inception network can be the utilized ML model 150. It will be appreciated that other types of machine learning models can be also be utilized and that an Inception network is described solely as an illustrative example. An inception network consists of a highly hand-crafted architecture. FIG. 3 is a diagram 300 illustrating an example Inception network, the Inception-v4. "Stem" is an initial set of stacked convolution/max-pooling operations performed before applying Inception blocks, and it can vary across different versions of Inception networks. In Inception-v4, there are three main modules as well as one reduction block. FIG. 3 shows an example of the Inception-A module.

The main characteristics of the Inception modules are as follows. First, in a CNN, the kernel size of the convolution operation relates to the range of distributed information that is captured by filters, i.e., the larger more globally and the smaller more locally. Due to the wide variation of the information location, the choice of the right kernel size is important and difficult. In order to deal with this problem, Inception modules are built to have multiple different sizes of filters in parallel at the same level. Thus, the Inception network is also wider in addition to being deeper. Second, very deep neural networks always face the challenge of expensive computation. Inception networks first reduce the dimension of input channels by adding an extra 1×1 convolution before the larger convolutions. In addition, they also use factorization to break down convolutions with larger sizes into smaller ones, for example, factorizing a 5×5 convolution into two consecutive 3×3 ones; factorizing a n×n convolution into two consecutive ones with sizes of 1×n and n×1 respectively. Third, residual connections can be introduced in Inception-ResNet, which, in turn, can speed up the training process of very deep networks.

As part of the experimental studies, three versions of Inception networks for the plagiarism detection task were used: Inception-v3, Inception-v4, and Inception-ResNet-v2. Compared with Inception-v3, Inception-v4 has a more uniform simplified architecture and more Inception modules. Meanwhile, it was found that Inception-ResNet-v2 added residual connections into the Inception architecture, which was empirically shown to accelerate the training of Inception net-works significantly. The TensorFlow source code was used to develop models.

The current innovations were informed by various experimentation with a focus in the context of a large-scale, high-stakes English language assessment for non-native speakers that assesses communication skills for academic purposes. The speaking section of this assessment contains six tasks designed to elicit spontaneous spoken responses: two of them require test takers to provide an opinion based on personal experience, which are referred to as independent tasks; and the other four tasks require test takers to summarize or discuss material provided in a reading and/or listening passage, which are referred to as integrated tasks. In general, the independent tasks ask questions on topics that are familiar to test takers and are not based on any stimulus materials. Therefore, test takers can provide responses containing a wide variety of specific examples, and most instances of plagiarism were found in these independent tasks.

The current subject matter addresses a problem with extremely imbalanced data, since only very few plagiarized responses are buried in a very large amount of non-plagiarized responses, and the percentage of plagiarized responses appearing in different test administrations can vary substantially. In order to conduct the experimental study, a data set from the operational assessment was collected across multiple years to build and test the automatic system. First, a total of 1,557 plagiarized responses to independent test questions were obtained and a set of 224 source materials identified and used by human raters in multiple years were also included. The average number of words in source materials was 95.0 (std. dev.=38.2).

Furthermore, a set of non-plagiarized control responses was also obtained in order to conduct classification experiments between plagiarized and non-plagiarized responses. As the plagiarized responses were collected over the course of multiple years and drawn from many different test forms, it was not practical to obtain control data from all of the test forms represented in the plagiarized set. As a result, only the 166 most frequent test forms were used for the collection of control responses, and 200 test takers were randomly selected from each form, without any overlap with speakers in the plagiarized set. Responses to independent questions were collected from each speaker; in total, 66,400 spoken responses from 33,200 speakers were obtained as the control set. Therefore, the number of control responses is approximately 43 times larger than the number of plagiarized responses in this data set.

A Kaldi-based automatic speech recognition (ASR) engine, which had a word error rate (WER) of 22.9% on a stand-alone test set of similar responses, was employed to transcribe the non-native speech into text. The training set used to develop the ASR system consists of around 800 hours of speech drawn from the same assessment and does not overlap with the data sets included in this study. In addition, an unsupervised language model (LM) adaptation method was used to improve the ASR performance on new unseen prompts: a) out-of-vocabulary (OOV) words from the prompt materials were added to the pronunciation dictionary and the baseline models were adapted with the prompts; b) the adapted models were applied to spoken responses from these new prompts to produce the recognized texts along with confidence scores corresponding to each response; c) automatically transcribed texts with confidence scores higher than a predefined threshold of 0.8 were selected; d) these high-confidence recognized texts were used to conduct another round of language model adaptation. Due to ASR failures, a small number of responses were excluded from the experiments; in total, 1,551 plagiarized and 66,257 control responses were included in the following experiments. Due to the large volume of data, we were unable to obtain human transcriptions on all responses; thus, the impact of speech recognition errors on the automatic detection system were not analyzed in the experimental study.

Around 10% of the positive (plagiarized) and 10% of the negative (non-plagiarized) samples were randomly selected as the test set, and the other responses were used as the training set in the following experiments. When generating the training samples, for the positive class, each response was paired with each of the sources used by the test taker to draw this response, while for the negative class, each response was paired with one randomly selected source.

Afterward, the paired samples were converted to 1-channel/ 3-channel labeled grids. While in the test set, each response should be paired with each source, and if any of them were classified as positive, then the test response was identified as an instance of plagiarism.

Baseline systems provided herein (and as used in the experimental study) can be built with the Random Forest classifier using, for example, scikit-learn, a machine learning tool. Two types of features can be used, including features based on n-gram overlap counts and features based on Word Mover's Distance (WMD).

Word n-grams, with n varying from 1 word to 11 words (as an example), can be first extracted from both the test response and each of the source materials, and then the number of overlapping n-grams, both types and tokens, can be counted separately, which can also be normalized by the number of n-grams either in the test response or in the source. Furthermore, the 11 n-gram overlap counts can be combined together to generate one weighted score between the test response and each source, where the weight for the i-gram is $i/(n \cdot (n+1)/2)$, and then the maximum score across all sources can be calculated as a feature to measure the similarity between the test response and the set of source materials. Furthermore, it can be noted that the n-gram based feature set can be enlarged by: 1) normalizing the n-gram counts by either the number of n-grams in the test response or the number of n-grams in each of the sources; 2) combining all source materials together into a single document for comparison, which was designed based on the assumption that test takers may attempt to use content from multiple sources. Based on all of these variations, a total of 116 n-gram overlap features were generated for each spoken response.

As the n-gram overlap features rely on exact word sequence matching, WMD can be employed to capture topically relevant words. Embeddings of words can be first represented as vectors with word2vec2 models, and then the distance between each word appearing in a test response and each word in a source can be measured using the Euclidean distance in the embedding space. WMD represents the sum of the minimum values among the Euclidean distances between words in two compared documents. This minimization problem is a special case of Earth Mover's Distance. WMD in this context outperforms other distance measures on document retrieval tasks and it is noted that the embeddings trained on the Google News corpus consistently perform well across a variety of contexts.

As described above, the Inception networks were compared with standard content similarity metrics on the task of detecting plagiarized spoken responses. As shown in Table 2, the baseline system obtained an F1-score of 74.1% with only n-gram features; the addition of word embedding-based WMD features reduced the F1-score to 73.5%.

Table 2 below shows precision, recall, and F1-score on the positive plagiarism class with different models.

TABLE 2

| | Precision (%) | Recall (%) | F1(%) |
|---|---|---|---|
| Inception Networks with 1-channel grids | | | |
| v3 | 70.4 | 84.5 | 76.8 |
| v4 | 76.3 | 83.2 | 79.6 |
| resnet_v2 | 72.3 | 82.6 | 77.1 |
| Inception Networks with 3-channel grids | | | |
| v3 | 76.3 | 76.8 | 76.5 |
| v4 | 79.1 | 75.5 | 77.2 |
| resnet_v2 | 79.0 | 70.3 | 74.4 |
| Baseline | | | |
| n-gram | 78.4 | 70.3 | 74.1 |
| n-gram + WMD | 77.7 | 69.7 | 73.5 |

In comparison, all three Inception networks consistently outperform the baseline systems in terms of F1-score. In particular, Inception-v4 networks achieve the best performance: with 3-channel grids, both the precision and recall are improved, from 78.4% to 79.1% and from 70.3% to 75.5% respectively; with 1-channel grids, although the precision decreases to 76.3%, the recall increases by a larger amount to 83.2%. Thus, the best F1-score can be achieved at 79.6% by applying Inception-v4 network on 1-channel grids. The developed automatic plagiarism detection system can be applied to benefit an actual speaking test, where responses flagged by the system would be subsequently reviewed by human experts. Therefore, optimizing recall is appropriate in this targeted use case while keeping the number of false positives, i.e., precision, within an acceptable range for the expert review.

Similar to the performance of the baseline systems, by introducing information about non-exact matches, i.e., using word stems and word embeddings in the 3-channel grids, the performance was reduced for all three architectures. These experiments indicate that for this particular task, the exact match of certain expressions appearing in both the test response and a source material plays a critical role whereas capturing the topical relevance between word pairs leads to degraded performance.

Figure 4:
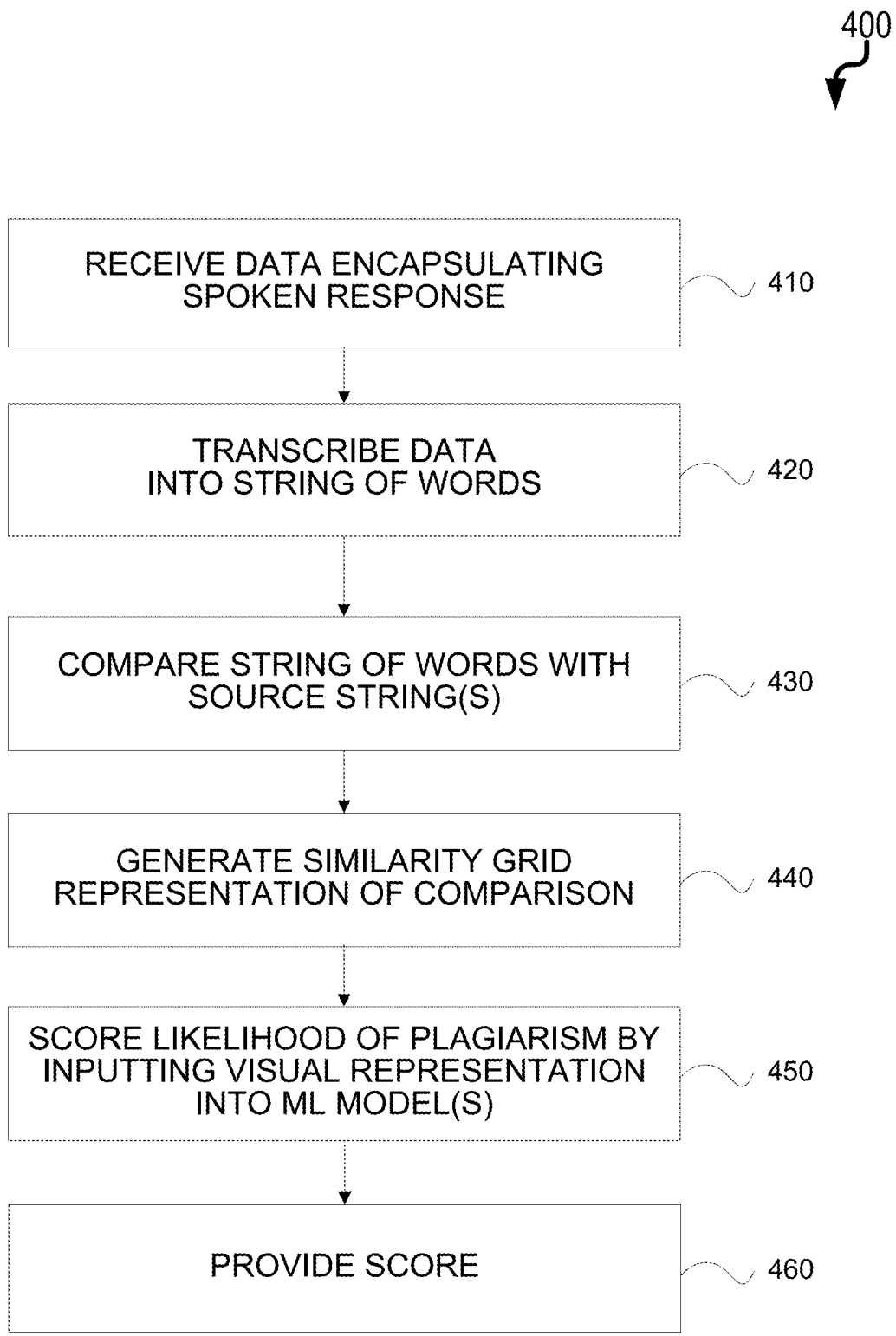
FIG. 4 is a process flow diagram illustrating the detection of plagiarized spoken responses using machine learning.

FIG. 4 is a process flow diagram 400 in which, at 410, data is received that encapsulates a spoken response to a test question. Thereafter, at 420, the received data is parsed into a string of words. The string of words is then compared, at 430, with at least one source string. Based on this comparison, at 440, a similarity grid representation is generated that visualizes a level of similarity between the string of words and the at least one source string. The similarity grid representation is then input, at 450, into at least one machine learning model to generate a score that indicates a likelihood of the spoken response having been plagiarized. Data encapsulating the score can then, at 460, be provided (e.g., displayed, stored, loaded into memory, transmitted to a remote computer, etc.)

Figure 5:
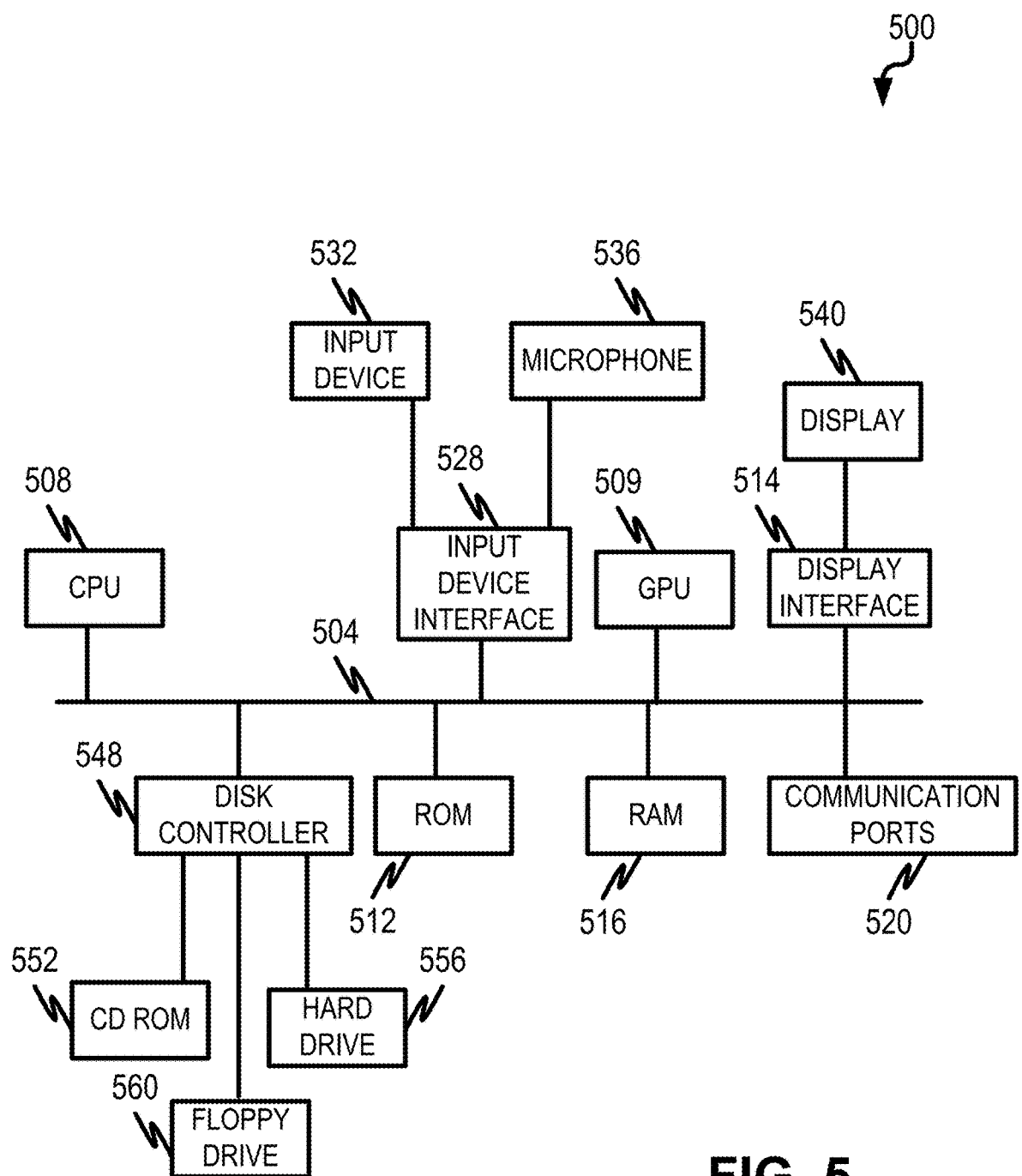
FIG. 5 is a diagram of a computing device for implementing aspects of the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers) and/or a processing system 509 GPU (graphics processing unit) can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving data encapsulating a spoken response to a test question;
transcribing the received data into a string of words;
comparing the string of words with at least one source string;
generating a similarity grid representation of the comparison that visually characterizes a level of similarity between the string of words and the at least one source string;
scoring the similarity grid representation using at least one machine learning model which uses the similarity grid representation as an input for an image recognition analysis, the score indicating a likelihood of the spoken response having been plagiarized; and
providing data encapsulating the score;
wherein:
the similarity grid representation comprises a plurality of channels, wherein the plurality of channels comprises a plurality of pixels, in which each pixel of the plurality of pixels has a value from among a range of values that indicates whether or not there is a match between pairs of words from the string of words and the at least one source string;
each channel utilizes a different similarity determination technique to generate the corresponding pixels.

2. The method of claim 1, wherein the providing comprises at least one of: displaying the score in an electronic visual display, loading data encapsulating the score in memory, storing the data encapsulating the score in physical persistence, or transmitting the data encapsulating the score to a remote computing device.

3. The method of claim 1, wherein the transcribing utilizes an automated speech recognition (ASR) engine.

4. The method of claim 1, wherein the at least one machine learning model comprises: a deep learning model.

5. The method of claim 4, wherein the deep learning model is a very deep convolutional neural network.

6. The method of claim 1, wherein a first of the similarity determination techniques indicates whether there is an exact match between a word in the string of words and the at least one source string.

7. The method of claim 6, wherein a second of the similarity determination techniques stems the words in the string of words and the at least one source string and compares the corresponding stems.

8. The method of claim 7, wherein a third of the similarity determination techniques calculates similarities between a word in the string of words and the at least one source string using embeddings.

9. A system comprising:
at least one data processor; and
memory storing instructions which, when executed by the at least one data processor, result in operations comprising:
receiving data encapsulating a spoken response to a test question;
transcribing the received data into a string of words;
comparing the string of words with at least one source string;
generating a similarity grid representation of the comparison that visually characterizes a level of similarity between the string of words and the at least one source string;
scoring the similarity grid representation using at least one machine learning model which uses the similarity grid representation as an input for an image recognition analysis, the score indicating a likelihood of the spoken response having been plagiarized; and
providing data encapsulating the score;
wherein:
the similarity grid representation comprises a plurality of channels, wherein the plurality of channels comprises a plurality of pixels, in which each pixel of the plurality of pixels has a value from among a range of values that indicates whether or not there is a match between pairs of words from the string of words and the at least one source string;
each channel utilizes a different similarity determination technique to generate the corresponding pixels.

10. The system of claim 9, wherein the providing comprises at least one of: displaying the score in an electronic visual display, loading data encapsulating the score in memory, storing the data encapsulating the score in physical persistence, or transmitting the data encapsulating the score to a remote computing device.

11. The system of claim 9, wherein the transcribing utilizes an automated speech recognition (ASR) engine.

12. The system of claim 9, wherein the at least one machine learning model comprises: a deep learning model.

13. The system of claim 12, wherein the deep learning model is a convolutional neural network.

14. The system of claim 9, wherein:
a first of the similarity determination techniques indicates whether there is an exact match between a word in the string of words and the at least one source string;
a second of the similarity determination techniques stems the words in the string of words and the at least one source string and compares the corresponding stems; and
a third of the similarity determination techniques calculates similarities between a word in the string of words and the at least one source string using embeddings.

15. A non-transitory computer program product storing instructions which, when executed by at least one computing device, result in operations comprising:
receiving data encapsulating a spoken response to a test question;
transcribing the received data into a string of words using an automated speech recognition engine utilizing an unsupervised language model (LM) adaptation method;
comparing the string of words with at least one source string;
generating a three channel similarity grid representation of the comparison that visually characterizes a level of similarity between the string of words and the at least one source string across different channels which each use a different similarity determination;
scoring the similarity grid representation using at least one convolutional neural network which uses the similarity grid representation as an input for an image recognition analysis, the score indicating a likelihood of the spoken response having been plagiarized; and
providing data encapsulating the score;
wherein:
the similarity grid representation comprises a plurality of channels, wherein the plurality of channels comprises a plurality of pixels, in which each pixel of the plurality of pixels has a value from among a range of values that indicates whether or not there is a match between pairs of words from the string of words and the at least one source string;

each channel utilizes a different similarity determination technique to generate the corresponding pixels;

the similarity determination techniques consist of:

a first similarity determination technique that indicates whether there is an exact match between a word in the string of words and the at least one source string;

a second similarity determination technique that stems the words in the string of words and the at least one source string and compares the corresponding stems; and a third similarity determination technique that calculates similarities between a word in the string of words and the at least one source string using embeddings.

\* \* \* \* \*